United States Patent
Fox et al.

(10) Patent No.: US 9,184,657 B2
(45) Date of Patent: Nov. 10, 2015

(54) DC CURRENT SENSING UTILIZING A CURRENT TRANSFORMER

(75) Inventors: David A. Fox, Rockford, IL (US); Jason A. Ohnemus, Rockford, IL (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 562 days.

(21) Appl. No.: 13/490,509

(22) Filed: Jun. 7, 2012

(65) Prior Publication Data

US 2013/0328538 A1    Dec. 12, 2013

(51) Int. Cl.
G05F 1/56 (2006.01)
H02M 3/156 (2006.01)
H02M 1/00 (2007.01)

(52) U.S. Cl.
CPC ...... H02M 3/156 (2013.01); *H02M 2001/0009* (2013.01)

(58) Field of Classification Search
CPC .............. H02M 3/156; H02M 3/1563; H02M 2001/0009
USPC .......................................... 323/282–285, 351
See application file for complete search history.

(56) References Cited

U.S. PATENT DOCUMENTS

| | | | |
|---|---|---|---|
| 4,307,441 A | 12/1981 | Bello | |
| 4,694,383 A | 9/1987 | Nguyen et al. | |
| 5,222,011 A * | 6/1993 | Braun | 361/154 |
| 5,428,286 A * | 6/1995 | Kha | 323/285 |
| 6,411,534 B1 | 6/2002 | Kurnia et al. | |
| 6,768,350 B1 | 7/2004 | Dickey | |
| 7,336,057 B2 | 2/2008 | Hirabayashi | |
| 7,741,737 B2 | 6/2010 | Kilroy | |
| 7,830,686 B2 | 11/2010 | Zeng et al. | |
| RE42,307 E | 4/2011 | Walters et al. | |
| 8,054,058 B2 * | 11/2011 | Liu et al. | 323/284 |
| 8,344,709 B2 * | 1/2013 | Zhang et al. | 323/222 |
| 8,787,043 B2 * | 7/2014 | Berghegger | 363/21.12 |
| 2003/0080723 A1 * | 5/2003 | Chen et al. | 324/76.29 |
| 2005/0280401 A1 | 12/2005 | Plankensteiner | |
| 2008/0007977 A1 * | 1/2008 | Piper et al. | 363/21.16 |
| 2011/0050185 A1 | 3/2011 | Notman et al. | |

* cited by examiner

*Primary Examiner* — Jessica Han
(74) *Attorney, Agent, or Firm* — Carlson, Gaskey & Olds, P.C.

(57) ABSTRACT

A DC/DC converter includes an internal transistor and a current sensor that is operable to sense a current passing through the transistor. The DC/DC converter also includes an output current estimator module that estimates the output current based on the sensed transistor current.

14 Claims, 2 Drawing Sheets

US 9,184,657 B2

DC CURRENT SENSING UTILIZING A CURRENT TRANSFORMER

TECHNICAL FIELD

The present disclosure relates to DC/DC converters and, more particularly, to a method and apparatus for determining a steady state DC output current of a DC/DC converter.

BACKGROUND OF THE INVENTION

DC/DC converters are commonly used in many applications throughout industry. Intermediate power level DC/DC converters operating between 500 watts and 50 kilowatts can be operated at varied voltages depending on the application and particular use of the converter. In order to use a current mode control scheme, a current transformer (CT) or other current sensor is incorporated into the DC/DC converter and provides a controller with an internal current measurement.

Embedded CTs, or similar sensors, do not provide a reading of the output current of the DC/DC converter, but rather measure an internal current at a transistor. As such, existing systems that wish to determine a time-averaged DC output current of the DC/DC converter in order to determine the operational status of the DC/DC converter must incorporate a second DC current sensor, such as a Hall Effect sensor or a current sensing shunt, on the output of the DC/DC converter. The addition of a second current sensor negatively impacts simplicity, size, and weight factors of the DC/DC converter. When a current sensing shunt is used, power dissipation requirements also increase.

SUMMARY OF THE INVENTION

A DC/DC converter comprising a transistor operable to control an output of a DC/DC converter; a current sensor operable to sense a current passing through the transistor, an output current estimator module connected to the current sensor, wherein the output current estimator module is operable to output a signal indicating an estimated output current of the DC/DC converter.

A current estimator module for a DC/DC converter having a first inverting amplifier; a second inverting amplifier, wherein an input of the second inverting amplifier is connected to an output of the first inverting amplifier by a summing junction; a switch connecting an output of the second inverting amplifier to the summing junction in a first position, and connecting a ground to the summing junction in a second position.

A method for estimating a DC/DC converter output having the step of determining an internal transistor current of a DC/DC converter; and determining an output current of the DC/DC converter based on the internal transistor current using an output current estimator module.

These and other features of the present invention can be best understood from the following specification and drawings, the following of which is a brief description.

DETAILED DESCRIPTION OF AN EMBODIMENT

Figure 1:
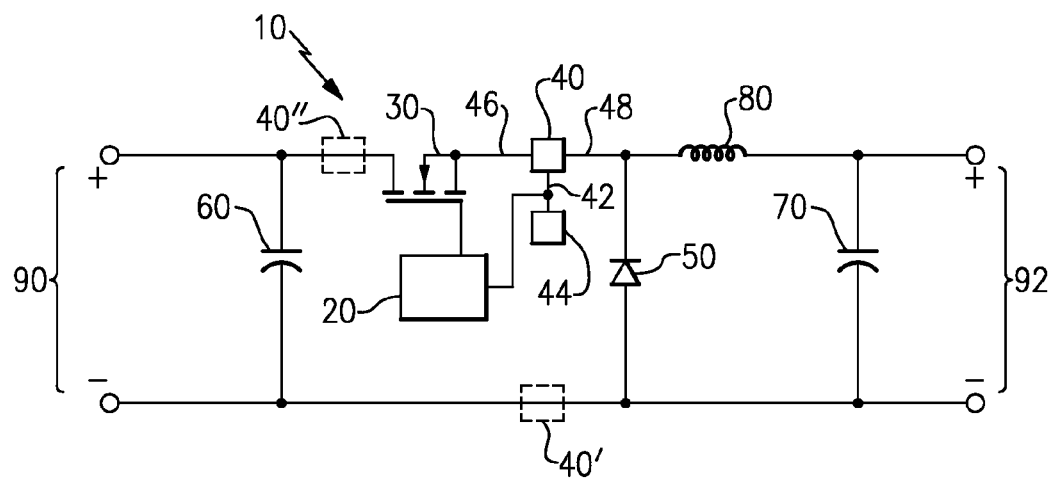
FIG. 1 illustrates a DC/DC converter.

FIG. 1 illustrates a DC/DC converter 10 arranged in a buck converter configuration. The DC/DC converter 10 has a +\−voltage input 90 that accepts DC power at a first voltage and a +/−voltage output 92 that outputs DC power at a second DC voltage. A capacitor 60 bridges the DC voltage input 90. Similarly, a capacitor 70 bridges the DC voltage output 92. A transistor 30 connects the positive terminal of the capacitor 60 to an inductor 80 input and a diode 50. The inductor 80 output is connected to the positive terminal of the output capacitor 70. The capacitors 60, 70, the inductor 80, and the transistor 30 operate in conjunction with a controller 20 to convert the DC power input to a desired DC power output according to known DC/DC converter techniques.

A transistor current sensor 40 is arranged in series between the transistor 30 and the inductor 80 input and senses the instantaneous current passing through the transistor 30. The current sensor 40 outputs a sensed transistor current 42 that is provided to the converter controller 20 and an output current estimator 44. The current sensor 40 accepts the sensed transistor current from a current sensor input line 46, and outputs the current to the inductor 80 on a current output line 48. In alternate configurations, the current sensor 40 can be located at 40' or 40". The converter controller 20 uses the sensed transistor current 42 to determine a necessary duty cycle of the transistor 30, and thereby control the output voltage of the DC/DC converter 10.

The current at the DC voltage output 92 is related to the current at the DC voltage input 90 by the following relationship: Iin=D*Iout, where Iin is the current at the input 90, Iout is the current at the output 92, and D is the percentage of on-time of the transistor during each period (the duty cycle of the transistor 30). Based on this relationship, it can be determined that: Iout=Iin/D. Thus, a circuit dividing the input current (Iin) by the duty cycle (D) of the transistor 30 provides an approximation of the output current. This approximation is a time averaged value of an entire period of the converter cycle and is not instantaneous.

Figure 2:
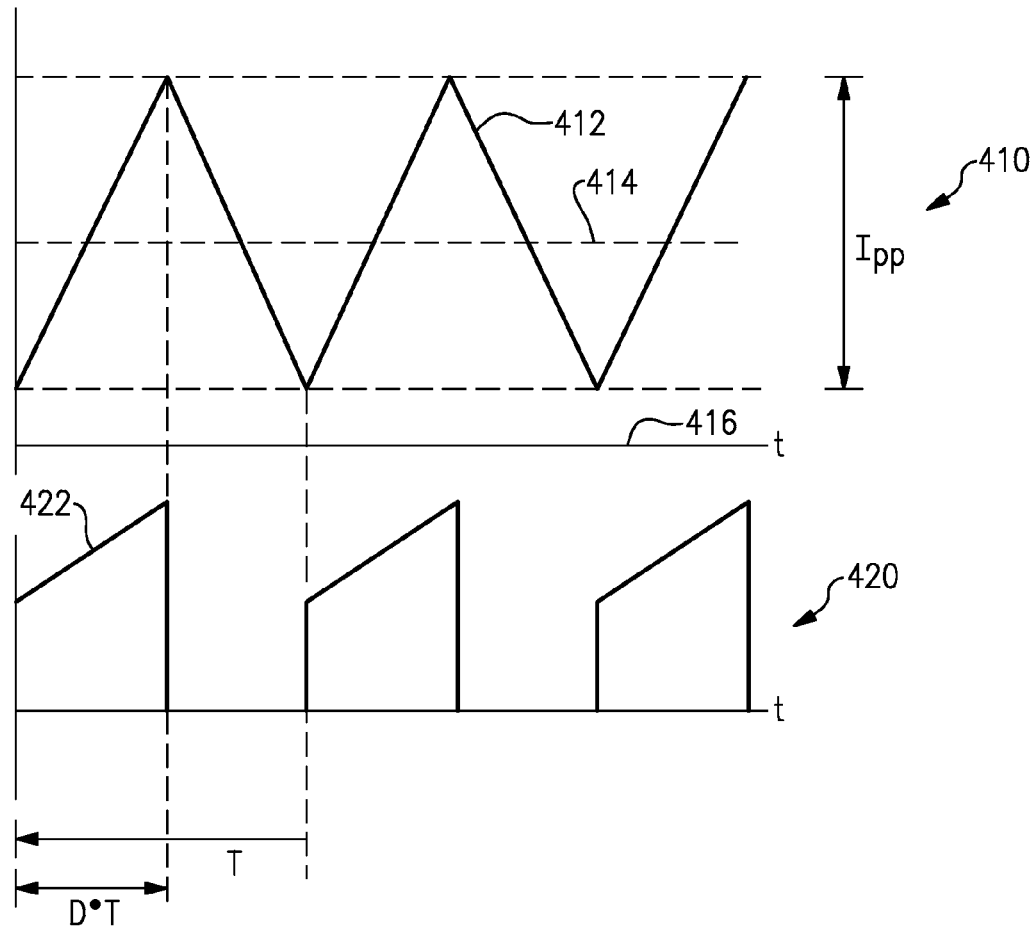
FIG. 2 illustrates a transistor current and an output current, with respect to time, of an example DC/DC converter.

Turning now to FIG. 2, with continued reference to FIG. 1, FIG. 2 illustrates an internal transistor current graph 420 and an output current graph 410 of an example DC/DC converter illustrating the above-described relationship. The output current graph 410 shows a current output 412 that has a time averaged current at 414, and a peak-to-peak current of Ipp. Likewise, the internal transistor current graph 420 illustrates an internal transistor current of a DC/DC converter, as measured by the current sensor 40. Both the output current graph 410 and the internal transistor current graph 420 have a period of T. The transistor 30 current is only on for the duty cycle (D) portion of the period T and is off for the reminder of the period.

While the following description illustrates a current transformer (CT) sensor as the current sensor 40 it is understood that the description can apply to any type of current sensor 40 measuring an internal transistor 30 current of a DC/DC converter. Furthermore, the output current estimator 44 can be utilized in any type of DC/DC converter 10 and a buck converter is used only for illustrative purposes.

Figure 3:
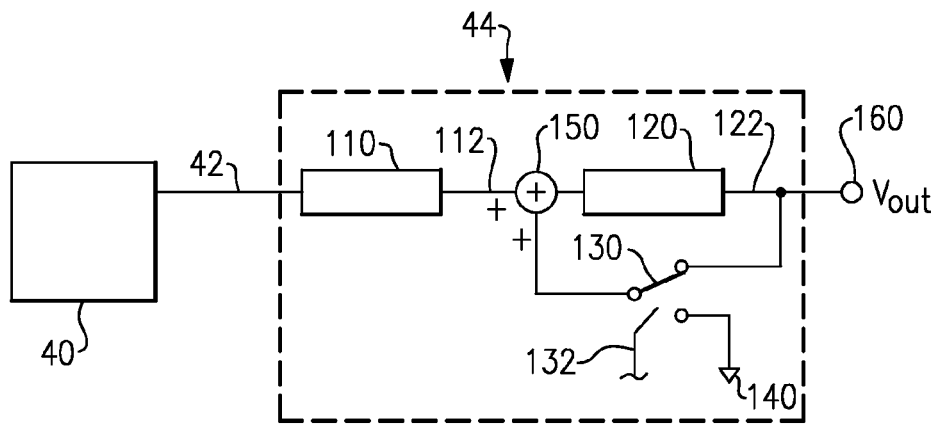
FIG. 3 illustrates a current sensor and a DC current output approximator.

FIG. 3 illustrates a schematic view of the current sensor 40 and the output current estimator 44 of the example DC/DC converter 10 of FIG. 1. The sensor signal 42 is output from the current sensor 40 to the output current estimator 44. The output current estimator 44 passes the sensed current 42 through an inverting amplifier/filter 110 that conditions the sensor signal 42 for use in the output current estimator 44. In order to minimize error caused by diverting current from the sensor signal 42 of the current sensor 40 to the output current estimator 44, the impedance of the inverting amplifier/filter 110 is set to a high impedance value. In order to minimize ripple in an inverting amplifier/filter 110 output 112, the time constant of the filter portion of the inverting amplifier/filter 110 is relatively slow. The inverting amplifier/filter 110 also conditions the signal by applying a gain to the sensed current signal to place the signal at an appropriate signal strength for a desired application.

A summing junction 150 connects the conditioned sensed transistor current signal 112 from an inverting amplifier/filter 110 to an input of an inverting integrator 120, and a switch 130. The switch 130 is arranged such that an output 122 of the inverting integrator 120 is connected to the summing junction 150 when the switch is in a first position and the summing junction 150 is connected to ground 140 when the switch 130 is in a second position. The switch 130 is controlled by a switch input signal 132 corresponding to the duty cycle of the transistor 30 of FIG. 1.

The operation of the switch 130 in conjunction with the duty cycle of the transistor 30 causes the feedback loop of the inverting integrator 120 to provide feedback to the summing junction 150 when the transistor 30 is on, and to provide no feedback when the transistor 30 is off. This functionality has the net effect of causing the feedback to be Vout*D. Since the inverting integrator 120 is arranged as a divider circuit, the net output signal 160 is divided by the duty cycle of the transistor 30 due to the feedback switch 130. The net effect of the illustrated output current estimator 44 is to reconstruct the output current of the DC/DC converter based on the current sensor 40 signal utilizing the formula Iout=Iin/D.

Figure 4:
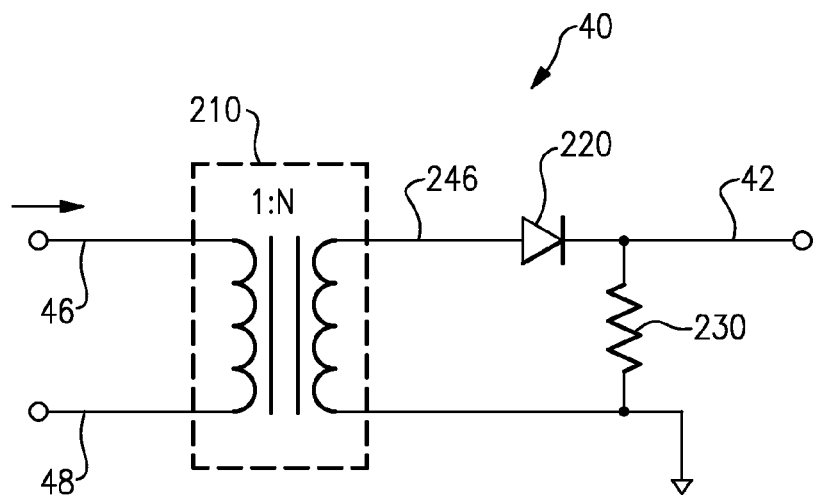
FIG. 4 illustrates a schematic of the current sensor of FIG. 3.

FIG. 4 illustrates a schematic of the current sensor 40 of FIGS. 1 and 3. On one side of a current transformer 210, the current sensor input 46 is accepted, passes through the current transformer 210, and is output on the output line 48. The current transformer 210 uses known electromagnetic principles to produce a proportional current signal on a current transformer output according to the winding ratio 1:N, where N can be determined according to known principles. The current transformer output 246 is passed through a diode 220 and a sense resistor 230. The voltage signal across resistor 230 is proportional to the input current, and is provided to the output current estimator 44. As described above, the impedance of the output current estimator 44 is sufficiently high that the current passing through the sense resistor 230 is not meaningfully impacted.

Figure 5A:
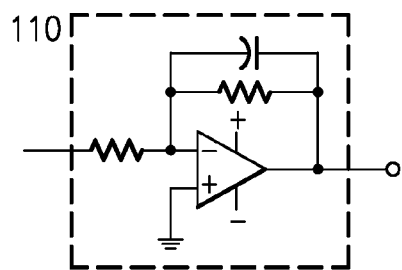
FIG. 5a illustrates an inverting amplifier circuit.
Figure 5B:
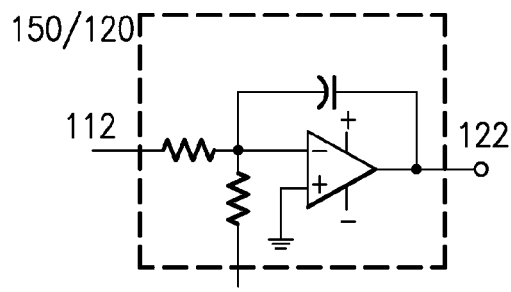
FIG. 5b illustrates an inverting summer circuit.

FIG. 5a illustrates an example inverting amplifier 110 that can be used as the inverting amplifier/filter 110 of FIG. 3. FIG. 5b illustrates an example inverting summer/integrator that can be used to incorporate the functions of summer 150 and the inverting integrator 120 of FIG. 3.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention. The technique may be used with any buck-derived converter topology, such as a transformer isolated full bridge converter.

The invention claimed is:

1. A DC/DC converter comprising:
   a transistor operable to control an output of said DC/DC converter;
   a current sensor operable to sense a current passing through said transistor; and
   an output current estimator module connected to said current sensor, wherein said output current estimator module is operable to output a signal indicating an estimated output current of said DC/DC converter;
   wherein said output current estimator module has a high impedance value relative to an impedance value of a sense resistor in said current sensor.

2. A DC/DC converter comprising:
   a transistor operable to control an output of said DC/DC converter;
   a current sensor operable to sense a current passing through said transistor;
   an output current estimator module connected to said current sensor, wherein said output current estimator module is operable to output a signal indicating an estimated output current of said DC/DC converter;
   wherein said output current estimator module comprises:
   a first inverting amplifier;
   a second inverting amplifier, wherein an input of said second inverting amplifier is connected to an output of said first inverting amplifier by a summing junction; and
   a switch connecting an output of said second inverting amplifier to said summing junction in a first position, and connecting a ground to said summing junction in a second position.

3. The DC/DC converter of claim 2, wherein said switch is controlled by a duty cycle signal of said transistor.

4. The DC/DC converter of claim 2, wherein said second inverting amplifier is a feedback loop when said switch is in said first position, thereby causing said output of said second inverting amplifier to be a sensed transistor current divided by a duty cycle of said transistor.

5. The DC/DC converter of claim 2, wherein said output current estimator module is a current divider module operable to divide a sensed transistor current by a duty cycle of said transistor.

6. The DC/DC converter of claim 2, wherein said current sensor is an embedded Current Transformer (CT).

7. The DC/DC converter of claim 2, wherein said DC/DC converter is a buck converter.

8. The DC/DC converter of claim 2, wherein said DC/DC converter is a buck-derived converter topology where an output voltage of the converter is proportional to the duty cycle of the switching transistor.

9. The DC/DC converter of claim 2, wherein said output current estimator module has a high impedance value relative to an impedance value of a sense resistor in said current sensor.

10. A current estimator module for a DC/DC converter comprising:
    a first inverting amplifier;
    a second inverting amplifier, wherein an input of said second inverting amplifier is connected to an output of said first inverting amplifier by a summing junction; and
    a switch connecting an output of said second inverting amplifier to said summing junction in a first position, and connecting a ground to said summing junction in a second position.

11. The current estimator module of claim 10, wherein said first inverting amplifier is a high impedance inverting amplifier.

12. The current estimator module of claim 10, wherein said switch includes a transistor duty cycle input, and wherein said transistor duty cycle input is operable to control a state of said switch.

13. A method for estimating a DC/DC converter output comprising:
- determining an internal transistor current of a DC/DC converter; and
- determining an output current of the DC/DC converter based on said internal transistor current using an output current estimator module,
- receiving a sensed transistor current signal at said output current estimator;
- dividing said sensed transistor current by a duty cycle of said transistor, thereby determining a time averaged output current of said DC/DC converter; and
- wherein said dividing of said sensed transistor current by a duty cycle of said transistor comprises accepting a sensed internal transistor current at a voltage divider circuit having a switch based feedback loop and outputting an estimated output current from said voltage divider.

14. The method of claim 13, further comprising connecting with a switch based feedback loop each of an output of said voltage divider circuit to an input of the voltage divider circuit when the transistor is on and connecting a ground to the input of the voltage divider circuit when the transistor is off.

* * * * *